(12) United States Patent
Levesque et al.

(10) Patent No.: US 9,919,732 B2
(45) Date of Patent: Mar. 20, 2018

(54) CONTROL ASSEMBLY FOR A VEHICLE STEER-BY-WIRE SYSTEM

(71) Applicant: Dura Operating, LLC, Auburn Hills, MI (US)

(72) Inventors: Steven P. Levesque, Rochester Hills, MI (US); Joseph W. Lewis, Rochester Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/147,952

(22) Filed: May 6, 2016

(65) Prior Publication Data

US 2017/0320515 A1 Nov. 9, 2017

(51) Int. Cl.
*B62D 5/04* (2006.01)
*B62D 5/00* (2006.01)

(52) U.S. Cl.
CPC ........... *B62D 5/001* (2013.01); *B62D 5/0433* (2013.01)

(58) Field of Classification Search
CPC ................... B62D 5/001–5/006; B62D 5/0433
See application file for complete search history.

(56) References Cited

U.S. PATENT DOCUMENTS

| | | | |
|---|---|---|---|
| 6,138,788 A | 10/2000 | Bohner et al. | |
| 6,220,385 B1 | 4/2001 | Bohner et al. | |
| 6,708,794 B2 | 3/2004 | Menjak et al. | |
| 7,140,465 B2 | 11/2006 | Dominke et al. | |
| 7,144,346 B2 | 12/2006 | Hermann et al. | |
| 7,172,051 B2 | 2/2007 | Nagamatsu et al. | |
| 7,174,987 B2 | 2/2007 | Husain | |
| 7,232,006 B2 | 6/2007 | Dominke et al. | |
| 7,308,964 B2 * | 12/2007 | Hara | B62D 1/163 180/402 |
| 7,523,805 B2 | 4/2009 | Imagaki et al. | |
| 7,604,083 B2 * | 10/2009 | Chino | B62D 1/163 180/402 |

(Continued)

FOREIGN PATENT DOCUMENTS

| | | |
|---|---|---|
| DE | 19755044 C1 | 3/1999 |
| DE | 19805015 C1 | 7/1999 |

(Continued)

OTHER PUBLICATIONS

EP Extended Search Report for EP Application No. 17166942.7 dated Dec. 12, 2017 (11 pages).

*Primary Examiner* — Kevin Hurley
(74) *Attorney, Agent, or Firm* — Reising Ethington P.C.; Matthew J. Schmidt; Robert E. Ford

(57) ABSTRACT

A steer-by-wire assembly for a steering system in a vehicle is described. The system includes a shaft rotatable in response to a steering input, a clutch that includes a brake member rotatable with the shaft and a reaction member, and an electromagnetic actuator that is selectively actuated to selectively provide a force to selectively engage the brake and reaction members. When the actuator is not actuated, the force between the brake and reaction members limits or prevents rotation of the brake member relative to the reaction member. And when the actuator is actuated, the force between the brake and reaction members is reduced or removed to permit rotation of the brake member relative to the reaction member.

45 Claims, 6 Drawing Sheets

(56) References Cited

U.S. PATENT DOCUMENTS

| | | | |
|---|---|---|---|
| 8,666,607 B2 | 3/2014 | Kojo | |
| 9,593,725 B2* | 3/2017 | Pritchard | ............... F16D 27/14 |
| 2015/0129347 A1* | 5/2015 | Wager | ................... B60K 17/02 |
| | | | 180/385 |

FOREIGN PATENT DOCUMENTS

| | | |
|---|---|---|
| DE | 19834868 A1 | 2/2000 |
| EP | 1939069 A1 | 7/2008 |
| EP | 3081456 A1 | 10/2016 |
| WO | WO0240336 A1 | 5/2002 |

\* cited by examiner

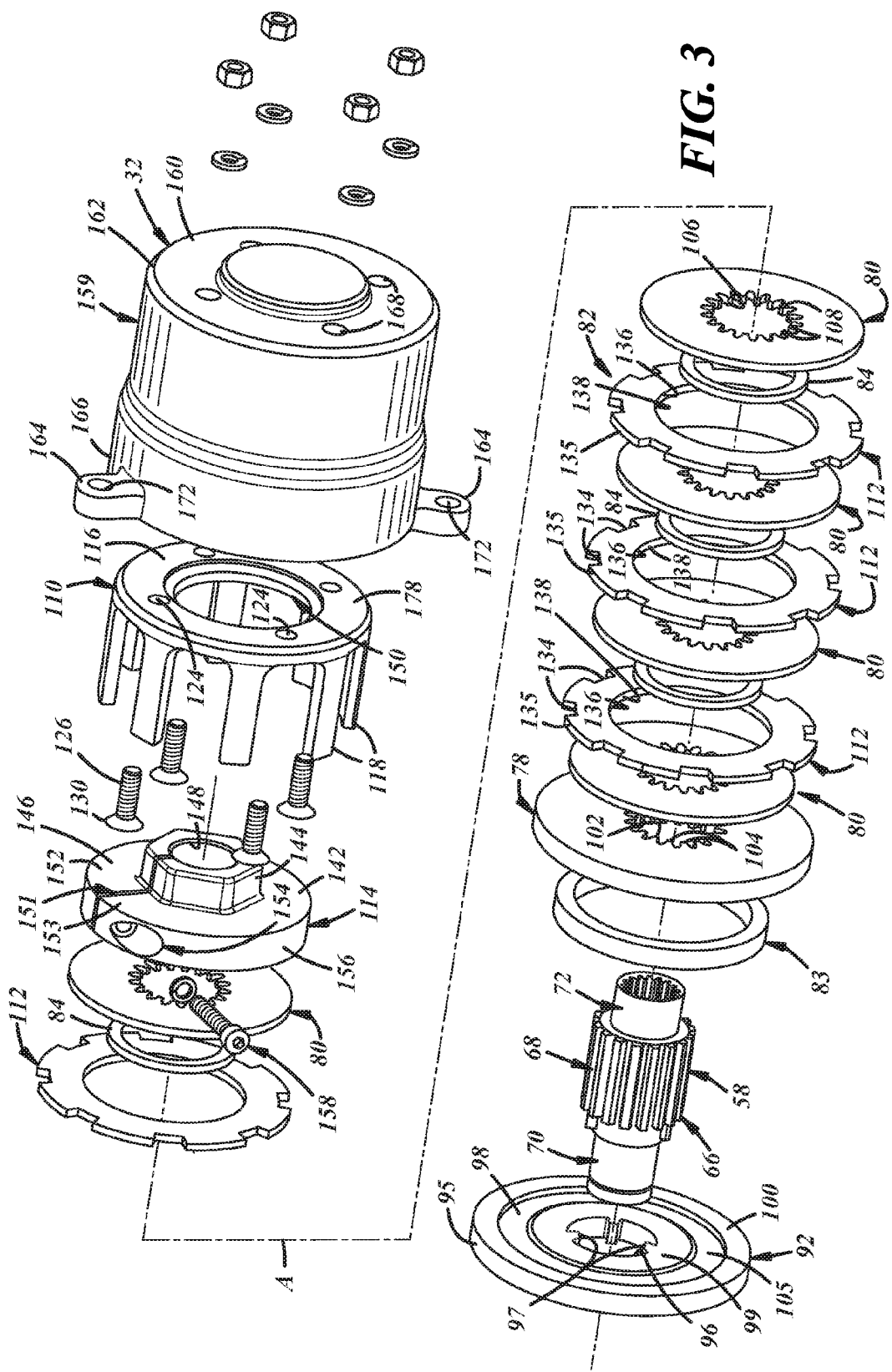

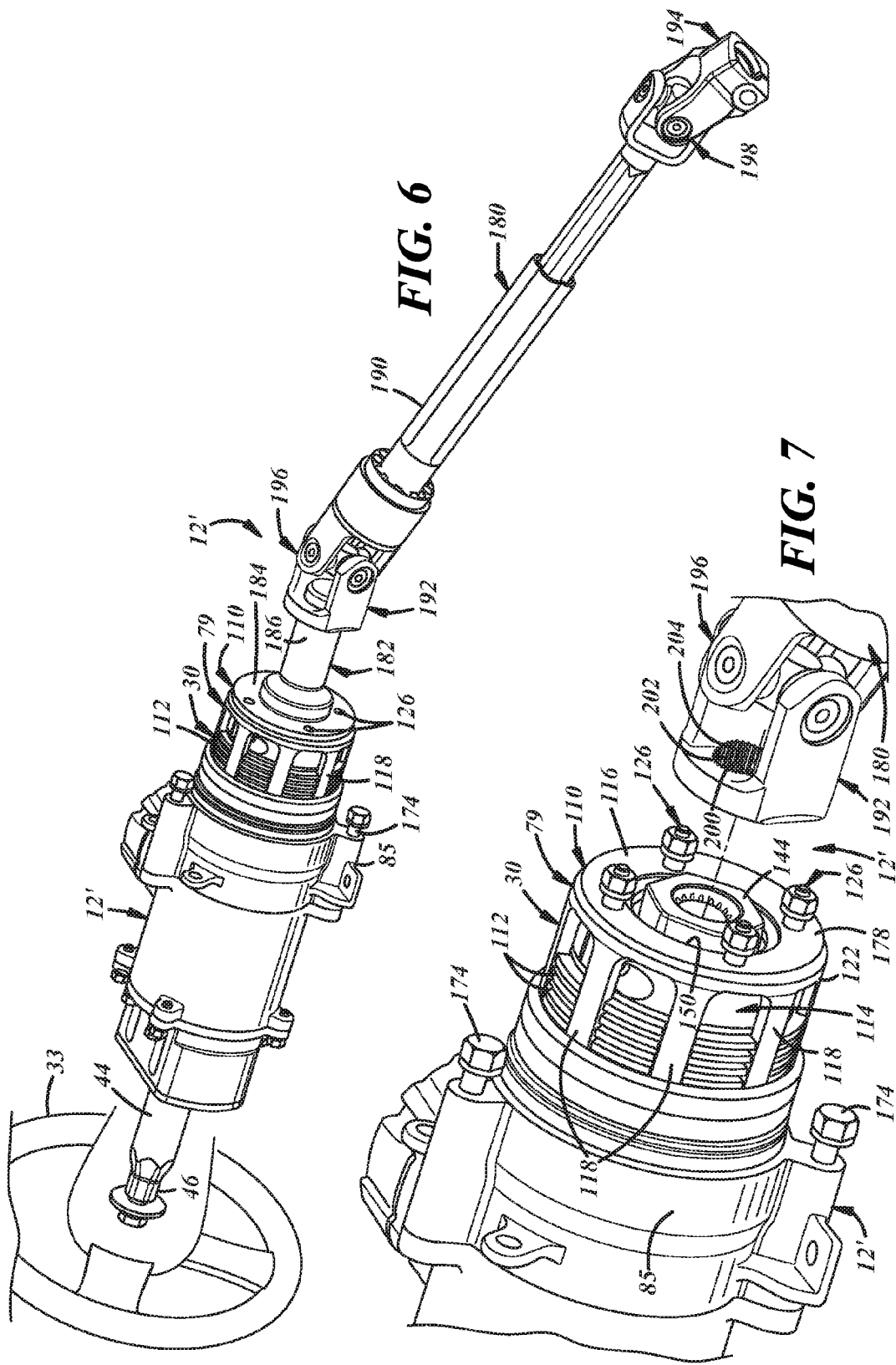

CONTROL ASSEMBLY FOR A VEHICLE STEER-BY-WIRE SYSTEM

TECHNICAL FIELD

The present disclosure relates to a control assembly for a vehicle steer-by-wire system.

BACKGROUND

Conventional vehicle steering systems require a mechanical linkage between a vehicle steering wheel and the road wheels. A steering knuckle or the like may engage another steering component and mechanically inhibit rotation of the steering wheel more than a predetermined number of turns (e.g., in either direction). As the mechanical linkage is not required in steer-by-wire systems, there is a need to provide end stops or the like to prevent the steering wheel from being continually rotated.

SUMMARY

In at least some implementations, a steer-by-wire assembly for a steering system includes a shaft rotatable in response to a steering input, a clutch that includes a brake member rotatable with the shaft and a reaction member, and an electromagnetic actuator that is selectively actuated to selectively provide a force to selectively engage the brake and reaction members. When the actuator is not actuated, the force between the brake and reaction members limits or prevents rotation of the brake member relative to the reaction member. And when the actuator is actuated, the force between the brake and reaction members is reduced or removed to permit rotation of the brake member relative to the reaction member.

In at least some implementations, a steer-by-wire assembly for a steering system includes a shaft rotatable in response to a steering input, a clutch that includes a brake member rotatable with the shaft, a retainer, and a reaction member, and an electromagnetic actuator that is selectively actuated to selectively provide a force to selectively engage the brake and reaction members. When the actuator is not actuated, the force between the brake and reaction members limit or prevent rotation of the brake member relative to the reaction member and also limits or prevents rotation of the shaft relative to the retainer. And when the actuator is actuated, the force between the brake and reaction members is reduced or removed to permit rotation of the brake member relative to the reaction member.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 3 is an exploded, perspective view of a portion of a control assembly of the steer-by-wire assembly;

FIG. 6 is a perspective view of the steer-by-wire assembly with an end cover removed, the assembly joined to a mechanical linkage via a coupler; and FIG. 7 is an enlarged view of a portion of FIG. 6, wherein the coupler is hidden.

DETAILED DESCRIPTION

Figure 1:
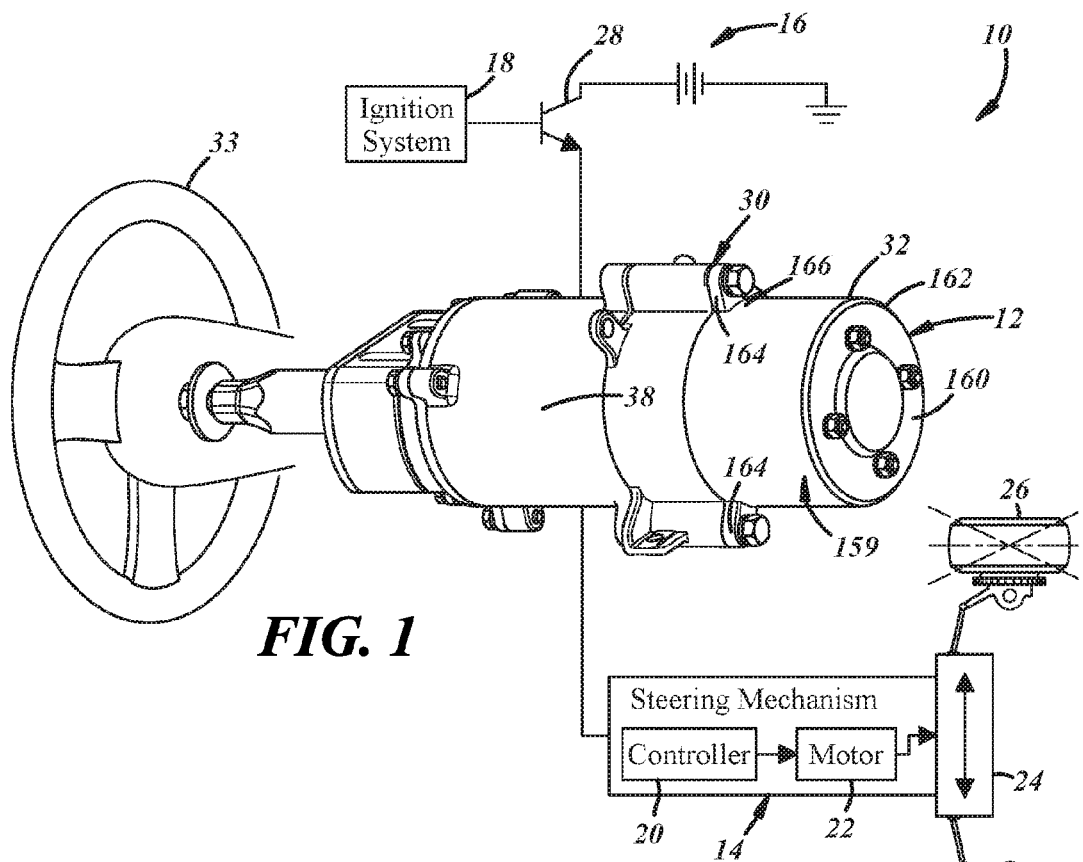
FIG. 1 illustrates a steer-by-wire system that includes a steer-by-wire assembly, shown in perspective, and a schematic diagram of the remainder of the system.

Referring in more detail to the drawings, FIG. 1 illustrates one embodiment of a vehicle steer-by-wire system 10 that includes a steer-by-wire assembly 12 electrically coupled to a vehicle steering mechanism 14, a power source 16 (e.g., such a vehicle battery), and a vehicle ignition system 18. The steering mechanism 14 may include a controller 20, an electric motor 22, and a gearing system 24 used to actuate or turn the wheels 26 of a vehicle. For example, the controller 20 may receive steering control signals from the steer-by-wire assembly 12, control the electric motor 22 using those control signals, and the electric motor 22 then may actuate the gear system 24 to turn the wheels 26. For example, controlling the electric motor 22 to operate in a first direction (e.g., clockwise) may cause the gear assembly 24 to drive the wheels 26 rightward, while controlling the electric motor 22 to operate in an opposing direction (e.g., counter-clockwise) may cause the gear assembly 24 to drive the wheels 26 leftward. Thus, no mechanical linkage is required between the steer-by-wire assembly 12 and the gearing system 24. Of course, the steering mechanism 14 shown in FIG. 1 is merely illustrative, and other implementations are possible.

The ignition system 18 may control the receipt of electrical power at the steer-by-wire assembly 12. FIG. 1 illustrates a switch 28 (e.g., shown here as a power transistor) actuatable by the ignition system 18. For example, the ignition system 18 may toggle the switch 28 between an ON state and an OFF state thereby controlling the delivery of electrical power to the steer-by-wire assembly 12 from the power source 16 (e.g., when the vehicle actuates 'on' or 'off'). Of course, control via ignition system 18 and the switch 28 are also illustrative; e.g., the steer-by-wire assembly 12 may be powered in other ways as well.

As will be explained in greater detail below, the steer-by-wire assembly 12 includes a steering control assembly 30 which, in FIG. 1, is partially contained within an end cover or housing 32. The control assembly 30 is adapted to selectively inhibit rotation of a steering wheel 33 as desired. For example, the control assembly 30 may inhibit or prevent steering wheel rotation at preconfigured end stops—e.g., wherein the end stops inhibit or prevent additional clockwise (CW) or counter-clockwise (CCW) rotation of the steering wheel 33. In addition, the control assembly 30 also may inhibit steering wheel rotation when ignition is off.

Figure 2:
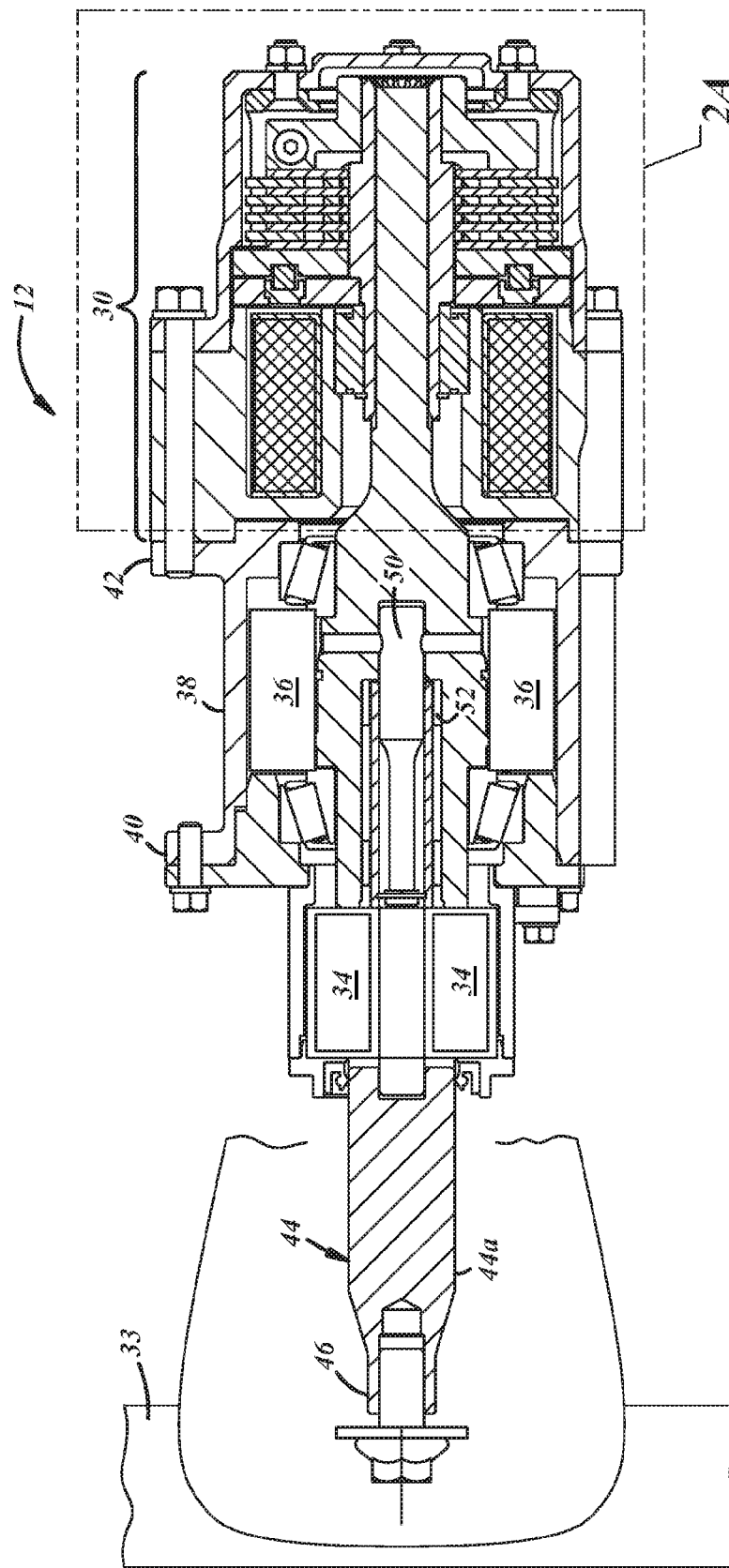
FIG. 2 is a sectional view of a portion of the steer-by-wire assembly shown in FIG. 1.
Figure 2A:
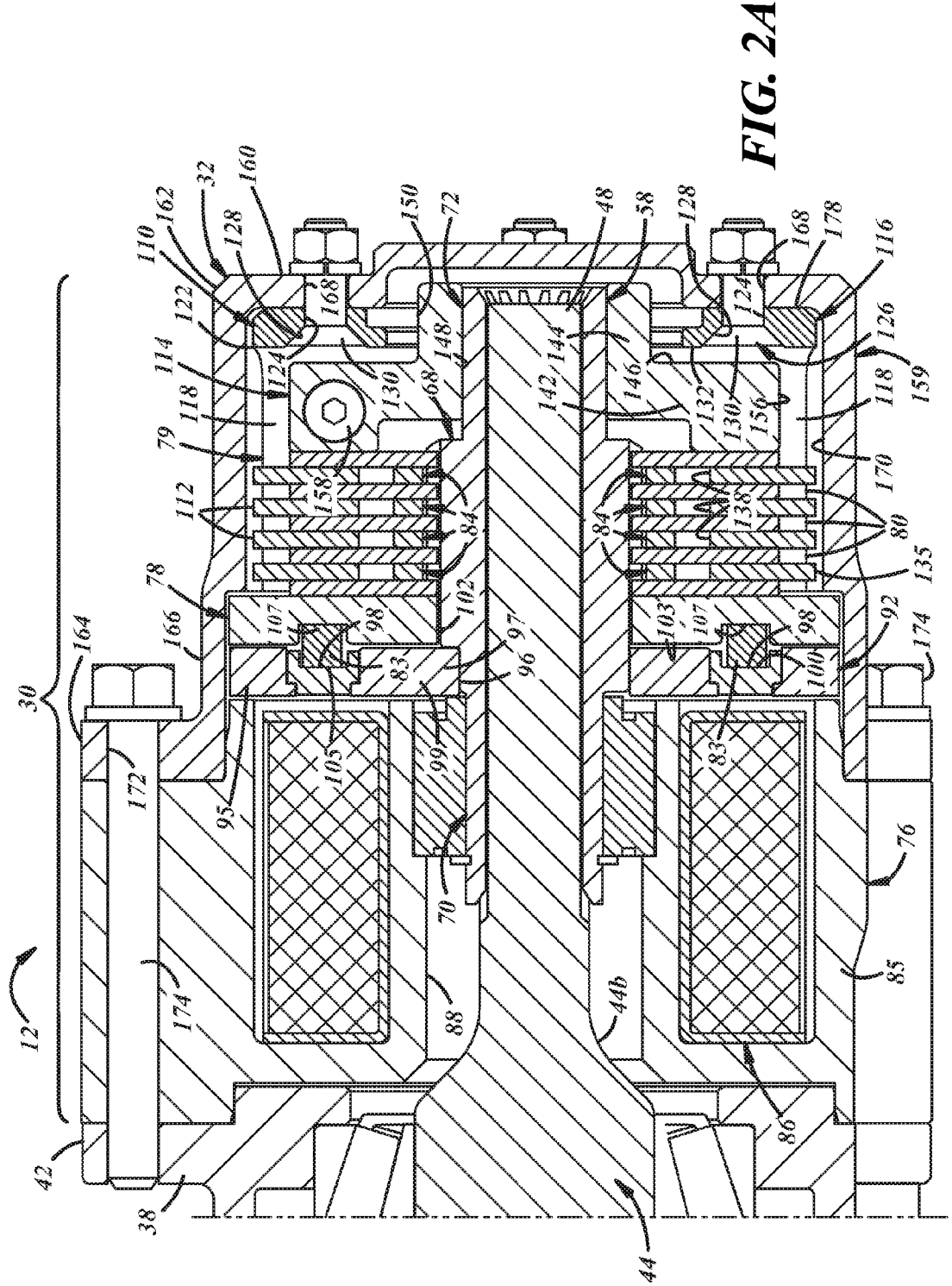
FIG. 2A is an enlarged view of a portion of FIG. 2.

Turning now to the sectional view of the steer-by-wire assembly 12 shown in FIGS. 2 and 2A, in at least one implementation, the assembly 12 includes a position and torque sensing unit 34, a feedback motor 36 carried by a housing 38, the control assembly 30, and the end cover 32. More specifically, the sensing unit 34 may be coupled to one end 40 of the feedback motor 36 and housing 38, and the control assembly 30 (and end cover 32) may be coupled to an opposing end 42 of the feedback motor 36 and housing 38. In the illustrated embodiment, a steering shaft 44 passes through the sensing unit 34, feedback motor 36, and at least a portion of the control assembly 30. A first portion 44a of the shaft 44 may extend from the sensing unit 34 and may be adapted to receive and secure steering wheel 33 or other steering input using a fastener at a proximate end 46. At its other end, first portion 44a is connected to a second portion 44b of the shaft, via a torsion bar 50. A distal end 48 of the second portion 44b of the shaft 44 may terminate within the control assembly 30. The shaft 44 may have a single- or multi-piece construction. Thus, the two-piece construction 44a, 44b shown in FIG. 2 having torsion bar 50 at a coupling region 52 is merely an example; other embodiments are possible. In at least one embodiment, the first and second portions 44a, 44b of the shaft 44 are aligned coaxially; however, this is merely one example.

Figure 4:
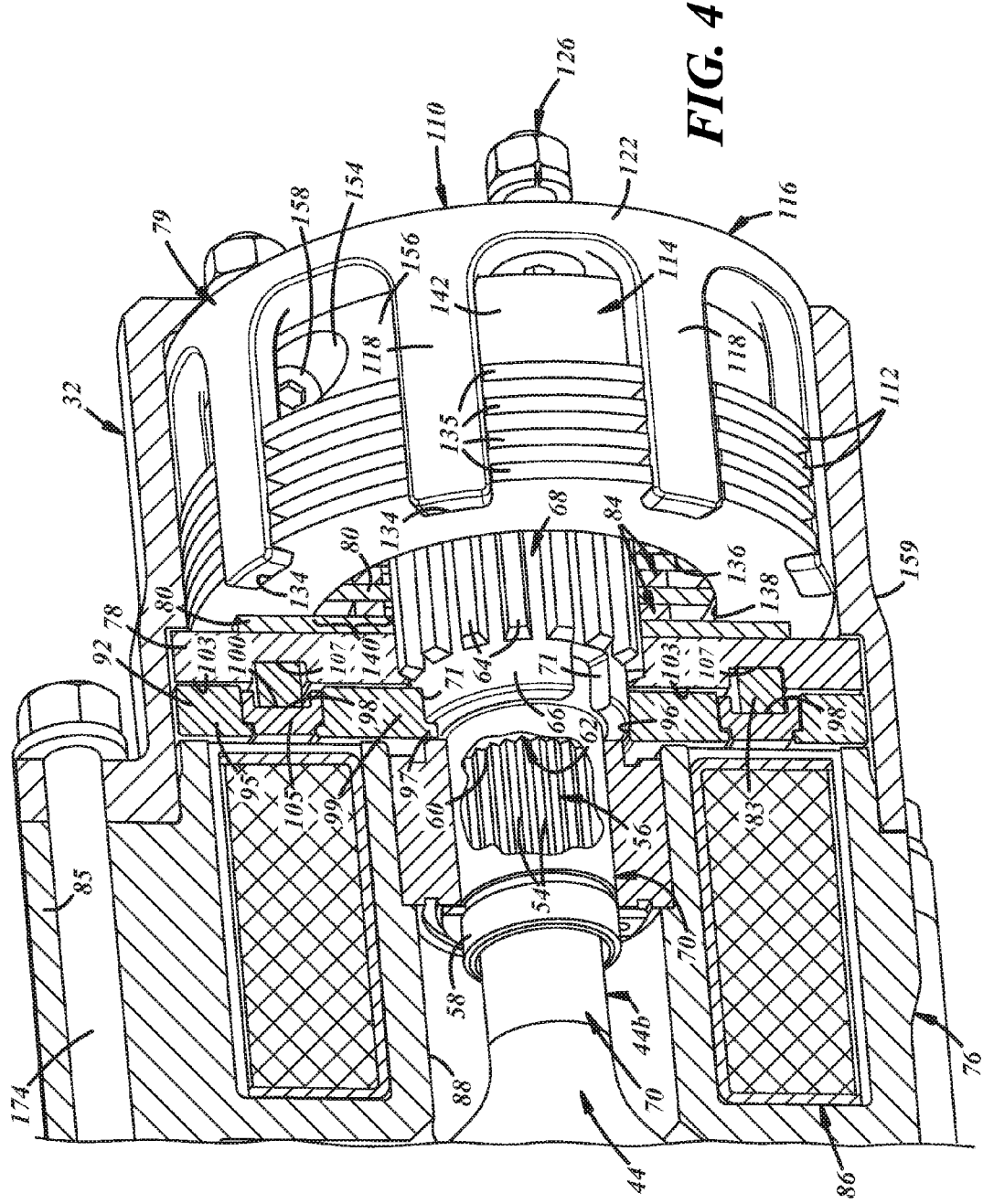
FIG. 4 is a perspective view of the control assembly, shown partially in section wherein a portion of a shaft sleeve is shown cut away.

As shown in the cut-away region of FIG. 4, the second portion 44b of the shaft 44 may have outwardly and axially-extending splines 54 on an outer surface 56, and may carry a shaft sleeve 58 (FIGS. 3 and 4) having corresponding inwardly and axially extending splines 60 (on an inner sleeve surface 62). Thus when assembled, the splines 54 and 60 may interleave inhibiting independent rotation of the shaft 44 relative to the shaft sleeve 58. The shaft sleeve 58 also may have outwardly and axially-extending splines 64 on an outer surface 66 thereof. In the illustrated embodiment, the splines 64 are arranged circumferentially in a middle region 68 of the sleeve 58, whereas end regions 70, 72 of the outer surface 66 are without splines (see also FIG. 3). In addition, the end regions 70, 72 may have smaller diameters than the middle region 68; however, this is merely one example. The middle region 68 may also have one or more notches 71 (e.g., two are shown in FIG. 4)—e.g., located where the middle region 68 adjoins end region 70; these notches will be discussed more below. It should be appreciated that other embodiments of the shaft sleeve 58 and the second portion 44b of shaft 44 may be utilized.

Returning to FIG. 2, the position and torque sensing unit 34 may be adapted to determine a shaft angular-position steering input, a shaft torque steering input, or both. In one embodiment, when powered, the sensing unit 34 continuously provides steering control signal(s) to the steering mechanism 14 (FIG. 1) which are indicative of an angular shaft position and an applied torque. In addition, the sensing unit 34 may be coupled electrically to the feedback motor 36, as described below.

The feedback motor 36 may be mechanically coupled to the shaft 44 in order to provide so-called 'road-feel'—e.g., a rotational resistance profile experienced by the driver which typically is associated with turning the steering wheel 33 having a mechanically coupled gear assembly (e.g., in a non-steer-by-wire system). Thus, using electrical steering control signal(s) received from the sensing unit 34, the feedback motor 36 may provide rotational resistance to simulate road-feel to the driver.

FIGS. 2-5 illustrate the control assembly 30 and components thereof. The control assembly 30 includes an electromagnetic actuator 76, an armature 78 responsive to the actuator 76, and a clutch 79 that includes one or more brake members or plates 80, a retainer 110 that carries one or more reaction members or plates 112, an end plate 114, and a plurality of biasing members 83, 84. And the steering shaft 44 at least partially passes through the control assembly 30. And as will be explained below, in at least one embodiment, clutch 79 may be a multi-plate friction clutch that is selectively actuated to engage brake member(s) 80 with the reaction member(s) 112 selectively to inhibit or prevent steering shaft rotation.

As shown in FIG. 2A, the electromagnetic actuator 76 includes a body 85 that includes a coil 86 having an axial passage 88 therethrough sized to allow the second portion 44b of the shaft 44 to rotate freely. The coil 86 may include more than one wire, each coiled around a bobbin or spool—each wire coil having any suitable number of turns. The coil 86 may be energized (e.g., via the power source 16) so that current flows therethrough generating a magnetic field that attracts the armature 78, as discussed more below.

In some implementations, the actuator 76 may include a buttress plate 92 between of the actuator body 85 and the armature 78 (see FIGS. 2 and 4). The buttress plate 92 may be an annular disk assembly coaxially aligned with the coil 86; the plate 92 may include an outer annulus 95, an inner annulus 99, and a center ring 105 assembled such that the center ring 105 is press-fit between the outer and inner annuluses 95, 99 forming the single disk-like assembly. In at least one embodiment, the outer and inner annuluses 95, 99 are composed of a magnetically-responsive material (e.g., a ferrous material such as steel to cite one non-limiting example), and the center ring 105 is composed of a non-magnetically-responsive material (e.g., a non-ferrous material such as Aluminum to cite one non-limiting example). Further, the center ring 105 may have an axial thickness less than the annuluses 95, 99 and/or may have an annular recess 98 on one side 100 of the recess 98 which faces the armature 78 which is adapted to receive biasing member 83, as described below. The inner annulus 99 may have a coaxial hole 96 therethrough sized to allow end portion 70 of the shaft sleeve 58 to pass therethrough. In at least one embodiment, one or more protrusions 97 may extend radially inwardly from an edge of the hole 96. For example, the illustrated two protrusions 97 may be sized to fit within the notches 71 of the middle region 68 of the shaft sleeve 58 so that the buttress plate 92 may rotate with the shaft 44.

The armature 78 may be an annular disk or plate that may be coaxially aligned with coil 86 and plate 92 and is responsive to the magnetic field generated by the actuator 76. In at least one non-limiting example, the armature 78 is at least partially composed of a ferrous material. The armature 78 may have a hole 102 passing therethrough which is sized to receive the middle region 68 of the shaft sleeve 58. More specifically, the hole 102 may have radially inwardly-facing splines or tabs 104 that correspond to the splines 64 on the outer surface 66 of the sleeve 58 so that the armature 78 rotates therewith (e.g., see FIG. 3). Further, the splines 104 may be sized to allow the armature 78 to slide or axially shift along the shaft sleeve 58 during operation, as will be explained more below. One side 103 of the armature 78 (e.g., which faces buttress plate 92) may have an annular recess 107 that corresponds with recess 98 and is sized to capture biasing member 83, as will be described more below.

Now turning to the clutch, the clutch 79 may have a single brake plate or multiple brake plates 80. In the illustrated embodiment, five plates are shown (of course, this is merely one embodiment and other quantities are possible). As each brake plate 80 may be identical, only one will be described. As best shown in FIG. 3, the brake plate 80 may be an annular disk having a hole 106 passing therethrough—the hole 106 having radially inwardly-facing splines 108 similar to the splines 104 of the armature 78 (described above). Thus, the brake plate(s) 80 may be rotated by and rotated with the shaft 44. Like the armature 78, the brake plates 80 may be configured to slide or axially shift along the shaft sleeve 58 during operation. And each brake plate 80 may be adapted to frictionally engage other components of the clutch 79, as described below.

Figure 5:
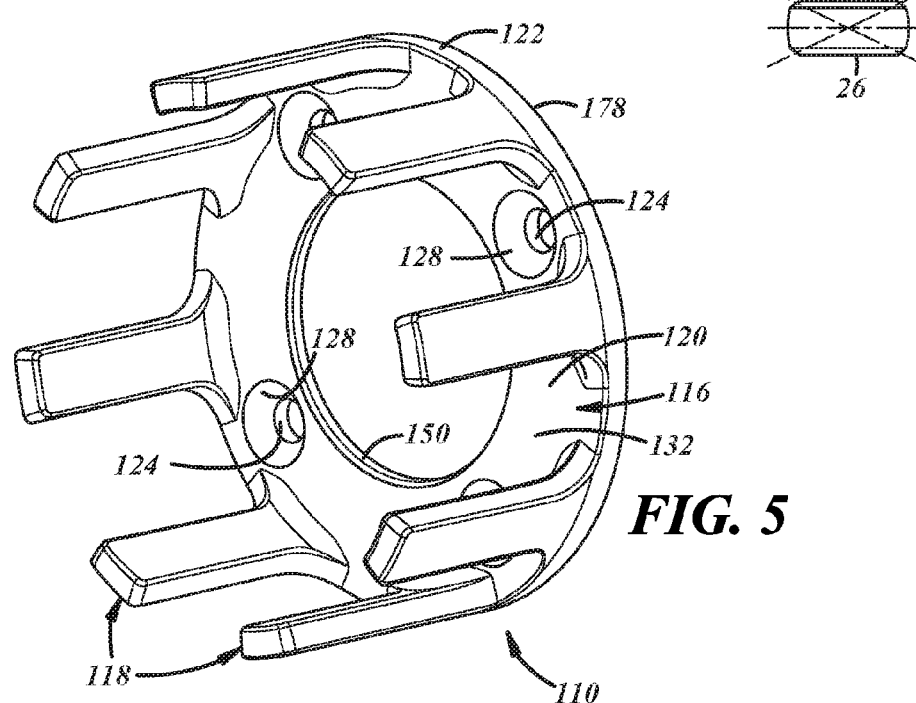
FIG. 5 is a perspective view of a retainer of the control assembly.

The retainer 110 for carrying the reaction plate(s) 112 includes an annular base 116 having a number of legs 118 extending axially from the base 116 at a periphery 122. In at least one implementation, each leg 118 is identical and generally rectangular. In the illustrated embodiment, eight legs 118 are shown; however, the shape of and quantity of legs 118 are merely exemplary (other shapes and quantities are possible). The base 116 may have circumferentially-spaced holes 124 therethrough adapted receive fasteners 126 which fix the retainer 110 to another steering component (e.g., such as end cover 32 in the embodiment shown in FIGS. 1-4). As shown in FIG. 5, in one implementation, one side 120 of base 116 includes counterbores 128 at each of the holes 124 so that the heads 130 of the fasteners 126 may be generally flush with respect to a surface 132—e.g., to avoid interference during operation between the fasteners 126 and rotating end plate 114.

In the illustrated embodiment, four reaction plates 112 are shown located interstitially between five brake plates 80. This again is merely one embodiment; other quantities are possible. Each of the reaction plates 112 may be identical; therefore, only one will be described. The reaction plate 112 may be an annular disk having a number of circumferentially-spaced voids 134 (e.g., a recesses or cavities) open to a periphery 135 of the plate 112. Each void 134 may be adapted to receive one of the legs 118 of retainer 110 (thus, the reaction plates 112 may not rotate with respect to the retainer 110). The illustrated reaction plate embodiment has eight voids 134 which correspond to eight legs 118; however, this is merely an example. An aperture 136 of each reaction plate 112 may be larger than the through-hole 106 of each brake plate 80—and e.g., each aperture 136 may have a larger diameter than the middle region 68 of the shaft sleeve 58. Therefore, in the illustrated embodiment, the reaction plates 112 do not engage the shaft 44 or sleeve 58; and thus, the plates 112 do not rotate with respect to the shaft 44. Thus when assembled, an inner edge 138 of each plate 112 may be spaced from the sleeve by a gap 140 (as best shown in FIGS. 2 and 4). Each reaction plate 112 may be composed of any material suitably adapted to allow frictional engagement with the brake plate(s) 80.

As best shown in FIGS. 2-3, the end plate 114 may include an annular base 142 having a neck 144 extending axially from one side 146 toward the distal end 48 of shaft 44 (when assembled). An aperture 148 extends through the base 142 and neck 144 and is sized to receive end region 72 of the shaft sleeve 58. Further, the neck 144 may be sized to be received without interference within an aperture 150 of the retainer's base 116. In at least one embodiment, the neck 144 has a hexagonal-shape to facilitate assembly of the end plate 114 to the shaft sleeve 58, as described below.

In at least one embodiment, the end plate 114 may be adapted to clamp against the shaft sleeve 58. For example, as shown in FIG. 3, the end plate 114 may be C-shaped; e.g., the base 142 and neck 144 having a radially-outwardly extending gap 151 (e.g., from an axis A) that spaces a first circumferential end 152 of the end plate 114 from a second circumferential end 153. Further, the base 142 may have a chordal passage 154 near its periphery 156 that extends through the second circumferential end 153 and into the first circumferential end 152. The passage 154 may be adapted to receive a fastener 158, which when installed, draws the first and second ends 152, 153 together thereby clamping the end plate 114 onto the shaft sleeve 58. As will be explained in greater detail below, this may set a desired spacing between the reaction plates 112 and the brake plates 80—e.g., confining the armature 78, brake plates 80, and reaction plates 112 within a desired axial distance of the actuator 76 and coil 86.

The plurality of biasing members shown in FIGS. 2-4 includes main biasing member or spring 83 and one or more separator biasing members or springs 84. The main spring 83 may be captured in the annular recesses 98, 107 and between the buttress plate 92 and the armature 78. The separator spring(s) 84 may be sized to slide over the middle portion 68 of the shaft sleeve 58 and are sandwiched between adjacently-located brake plates 80 so that, in operation, they may axially bias adjacent plates 80 away from each other. Each separator spring 84 may be located in the gap 140 between the inner edge 138 of a corresponding reaction plate 112 and the middle portion 68 of the shaft sleeve 58 so that the springs 84 do not engage or act directly on the plates 112. In the illustrated embodiment, one main spring 83 and four separator springs 84 are shown; however, this is merely an example (other implementations are also possible).

As will be explained in greater detail below, the main spring 83 may axially urge the armature 78 into a frictional engagement with an adjacently-located brake plate 80 (when the coil 86 is in a de-energized state)—and axially compress together the brake plates 80 and the reaction plates 112 overcoming any force contributed by the separator springs 84. In this state, the plates 80, 112 are frictionally engaged and relative rotation between them is inhibited or prevented (at least under normal steering forces). And when the coil 86 is in an energized state, the armature 78 is displaced toward coil 86 against a force of main spring 83 and the separator springs 84 may urge the brake plates 80 out of frictional engagement with reaction plates 112. In at least one embodiment, at least some of the main and/or separator springs 83, 84 are wave springs; however, this is merely an example (other springs or suitable devices could be used instead). Further, non-annular springs, Belleville washers, etc. also could be used.

Turning now to the end cover 32 (shown in FIGS. 1-3), in one embodiment, the cover or locking feature 32 is generally cup-shaped; e.g., having a tubular body 159, a base 160 at one end 162, and one or more mounting tabs 164 at an opposing end 166. The tabs 164 may have through-holes 172 so that the cover 32 may be coupled to the actuator body 85, the housing 38, or both via one or more fasteners 174. The base 160 has a number of circumferentially-spaced through-holes 168 which correspondingly may be aligned with the holes 124 of the retainer 110. Thus, when the cover 32 is assembled, the retainer 110 may be fixed to the cover 32 using fasteners 126. As best shown in FIG. 2A, the body 159 defines a cavity 170 therein that is sized to receive at least the clutch 79, the armature 78, and at least a portion of the actuator 76. It will be appreciated that in the illustrated configuration, the cover 32 may be removed or secured without disassembling the control assembly 30.

During assembly of the steer-by-wire assembly 12, the position and torque sensing system 34 may be arranged onto the first portion 44a of the shaft 44 and the feedback motor 36 may be coupled thereto. The second portion 44b of the shaft 44 may be inserted through the axial passage 88 of the electromagnetic actuator 76. Next, the buttress plate 92 may be slid over the second portion 44b of the shaft 44 and located adjacent to the actuator 76. Thereafter, the shaft sleeve 58 may be located over the second portion 44b of the shaft 44—the splines 60 on the inner surface 62 of the sleeve 58 interleaving with the splines 54 of the shaft 44. In addition, the protrusions 97 of the plate 92 may be located within the notches 71 of the sleeve 58—e.g., so that the buttress plate 92 rotates with the sleeve 58 and shaft 44. The main spring 83 and armature 78 may be slid over the shaft sleeve 58 capturing the main spring 83 within recesses 98, 107. The inwardly-facing splines 104 of the armature 78 may be received in the splines 64 of the sleeve 58.

Thereafter, in at least one embodiment, the brake plates 80 (e.g., quantity n), the reaction plates 112 (e.g., quantity n−1), and the separator springs 84 (e.g., quantity n−1) may be slid onto the middle portion 68 of the sleeve 58 such that one reaction plate 112 and one separator spring 84 are located between any two brake plates 80.

The end plate 114 may retain the armature 78, main spring 83, the brake plates 80, the reaction plates 112, and the separator springs 84 on the middle portion 68 of the shaft sleeve 58. For example, the end plate 114—in an unclamped state—may be slid onto the end portion 72 (from the distal end 48 of the shaft 44) and be clamped or retained thereto. To clamp the end plate 114, the fastener 158 may be driven into the chordal passage 154 thereby drawing the first and second circumferential ends 152, 153 towards one another until the end plate 114 is in a clamped state. During clamping, the brake and reaction plates 80, 112 may be adjacent to one another in a frictionally-engaged position; e.g., this may require applying a sufficient axially-directed force against the end plate 114 (towards the actuator 76) to at least partially collapse the separator springs 84, wherein the force is not so great as to collapse the main spring 83. In this manner, when the actuator 76 is energized, the main spring 83 still may at least partially collapse allowing the separator springs 84 to space the brake plates 80 from the reaction plates 112.

Fasteners 126 may be inserted through the circumferentially-spaced holes 124 of the retainer 110—e.g., seating the heads 130 of the fasteners in the counterbores 128 of the retainer base 116 so that threaded regions thereof extend from a second side 178 (FIG. 3) of the retainer base 116. Thereafter, the retainer 110 may be located over the shaft 44 and aligned with the reaction plates 112. For example, the angular orientation of each reaction plate 112 may be adjusted so that each respective circumferentially-spaced void 134 is axially aligned—thereby allowing the retainer legs 118 to slide within the respective voids 134. In at least one embodiment, when assembled, the retainer base 116 may be spaced from the base 142 of the end plate 114 allowing rotation of the end plate 114 without interference with the retainer 110.

In the illustrated embodiment of FIGS. 1-4, the end cover 32 is shown coupled to the control assembly 30 as well. The circumferentially-spaced through holes 168 of the cover 32 may receive the threaded regions of the fasteners 126 (protruding from the retainer 110), and the cover 32 may be secured over the retainer 110 using washers and nuts or other suitable fastening components. The tabs 164 of the cover 32 may be secured to the body 85 of the actuator 76 (and/or housing 38), as shown in FIG. 2A. Thus, in the embodiment shown in FIGS. 1-5, rotation of the reaction plates 112 and retainer 110 may be inhibited, although the armature 78, brake plates 80, and end plate 114 may be rotatable with the shaft 44.

It should be appreciated that in other embodiments, the assembly of the steer-by-wire assembly 12 may be performed differently. And in some implementations, at least some of steps of assembly may be performed in a different order or concurrently with one another.

During operation of the steer-by-wire assembly 12, the coils 84 of the actuator 76 may be selectively actuated (an energized state) to selectively provide a force that frictionally disengages the brake plate(s) 80 and reaction plate(s) 112. And when the actuator 76 is not actuated (a de-energized state), the brake plate(s) 80 and reaction plate(s) 112 may frictionally engage. Thus, in the de-energized state, the control assembly 30 may provide an end stops or limits on shaft rotation because the brake plate(s) 80 rotate relative to shaft 44 (e.g., shaft 44 is inhibited from further clockwise rotation or from further counter-clockwise rotation). For example, the armature 78 not being influenced by a magnetic field of the actuator 76 is axially displaced by the main spring 83 toward the plate pack and axially urges the brake plates 80 against the interstitially-located reaction plates 112. The axial movement of the brake plates 80 compresses each separator spring 84 as well—e.g., at least to an axial extent that corresponds to a thickness of a corresponding reaction plate 112. Thus, in at least the illustrated embodiment, a biasing force of the main spring 83 may be greater than the sum of the biasing forces of the separator springs 84 so that the reaction plates 112 are engaged with the brake plates 80 in the de-energized state.

It should be appreciated that in the embodiment shown in FIGS. 1-4, the reaction plates 112 and retainer 110 may not rotate because retainer 110 is fixed to cover 32 (and the cover 32 is fixed to the body 85 of the actuator 76). Further, when the brakes plates 80 are frictionally engaged to the reaction plates 112, shaft rotation also is inhibited—e.g., as the inwardly-facing splines 108 of the brake plates 80 are engaged with the splines 64 of the sleeve 58 and the sleeve splines 60 are engaged with the shaft splines 54. Thus, rotation of the shaft 44 is inhibited or prevented when the control assembly 30 is de-energized.

In the energized state, the coils 86 generate a magnetic field that draws the armature 78 toward the buttress plate 92. Thus, the armature 78 is displaced and slides axially toward the buttress plate 92—increasing the axial distance between the armature 78 and the end plate 114. This displacement compresses the main spring 83 sufficiently to allow the brake plates 80 to rotate without significant frictional engagement with the reaction plates 112. The separator springs 84 (now not being acted upon by the biasing force of the main spring 83) increase the spacing between the brakes plates 80 from based on the axial displacement of the armature 78. Thus in the energized state, shaft 44 may be rotated by driver to cause wheel movement/vehicle steering. And using the sensing system 34, the feedback motor 36, and other steer-by-wire system components, the steering input may be used to control vehicle steering—e.g., by converting the steering input to an electrical control signal and using the control signal to operate the motor 22 in the steering mechanism 14.

Other embodiments also may be used. For example, in one embodiment, a reaction plate 112 is not located between two brake plates 80. For example, when the control assembly 30 is de-energized, a single brake member which is fixed to shaft 44 may engage a single reaction member. In another embodiment, the brake member may be part of the armature (i.e., so that armature 78 engages a reaction member when the control assembly 30 is de-energized). And in another embodiment, a reaction plate 112 may be part of the end plate 114 (i.e., so that the armature engages the end plate 114 without any brake plates therebetween). Further, any aspect or feature of one embodiment may be used with any other embodiment.

In some embodiments, the number of biasing members 84 may vary. In at least one embodiment, no separator springs 84 are used. Further, the shape and type of main and/or separator springs 83, 84 may vary as well.

In another embodiment, the shape of the retainer 110 may vary. For example, in one embodiment, at least some features of the retainer 110 (e.g. such as the legs 118) may be integral to the end cover 32.

In the illustrated embodiment, the shaft sleeve 58 is adapted to facilitate assembly of the control assembly 30; however, other implementations are possible. For example, in at least one embodiment, features of the shaft sleeve 58 may be integral with the shaft 44.

FIGS. 6-7 illustrate another embodiment of a steer-by-wire assembly 12' having a mechanical linkage or mechanical steering assembly 180 to act as a mechanical backup in the event of a fault or malfunction in the steer-by-wire system. FIG. 6 illustrates the control assembly 30 without the end cover 32. Further, a coupler or mechanical interface 182 is shown between the retainer 110 of the control assembly 30 and the mechanical linkage 180.

The coupler 182 includes a base 184 and a neck 186 extending therefrom. The base 184 may have circumferentially-spaced holes (hidden) adapted to receive the fasteners 126 of the retainer 110. And the neck 186 includes any suitable features adapted to couple the neck 186 to the mechanical linkage 180 so that the neck 186 does not rotate independently of the linkage 180. For example, the neck 186 may have axially-extending splines (hidden in FIG. 6). The illustrated coupler is merely exemplary; other implementations may be used as designed.

The mechanical linkage 180 may include any traditional steering linkage components to couple the control assembly 30 with gearing system 24 (shown in FIG. 1). The linkage 180 of FIG. 6 illustrates two end members 192, 194 coupled to the shaft via universal joints 196, 198. And as shown in FIG. 7, end member 192 has an aperture 200 sized to receive the neck 186 of the coupler 182. In the illustrated embodiment, an inner surface 202 of the aperture has splines 204 adapted to receive the splines of the neck 186—thereby preventing independent rotation of the coupler 182 with respect to the linkage 180. The linkage 180 shown in FIGS. 6-7 is merely one example; other linkages also are contemplated.

During operation of this embodiment, the mechanical linkage 180 may be rotatable when actuator 76 is in the de-energized state, as described below. As previously described, in the de-energized state, the brake plates 80 frictionally engage the reaction plates 112. When a steering input rotates the shaft 44, the engaged brake and reaction plates 80, 112 and retainer 110 also rotate (e.g., not being constrained by the end cover 32 which is absent in this embodiment). And as the retainer 110 rotates, so does the coupler 182 and mechanical linkage 180. Thus, in this implementation, a mechanical connection from the shaft 44 to the steering mechanism 14 (of FIG. 1) is provided when the control assembly 30 is de-energized so that a driver may steer the wheels 26 with a mechanical back-up, which may be desirable when power to the actuator is lost or interrupted.

When the actuator 76 is energized, the brake plates 80 again may be spaced from the reaction plates 112 (e.g., urged apart by the separator springs 84). Here, mechanical steering input may be received from a vehicle driver, and using the sensing system 34, the feedback motor 36, and other steer-by-wire system components, the steering input may be used to control vehicle steering, as described above with respect to the previous embodiment. For example, the steering input may be converted to an electrical control signal, and the control signal may be used to operate the motor 22 in the steering mechanism 14.

In at least one embodiment in the energized state, the mechanical linkage 180 may be rotated or driven as the wheels 26 are turned by the steer-by-wire system. For example, as the vehicle wheels 26 turn (controlled by electrical control signals), the mechanical linkage 180 may rotate, and consequently, the retainer 110 and reaction plates 112 may be rotated with respect to the shaft 44. However, this may have no adverse effect on the operation of the steer-by-wire assembly 12' since the brake and reaction plates 80, 112 are not significantly frictionally engaged. It should be appreciated that the embodiment illustrated in FIGS. 6-7 also may vary. For example, other embodiments are contemplated wherein the coupler 182 and/or mechanical linkage 180 may have different features and/or may interact with the steering mechanism 14 differently.

In the embodiment shown in FIGS. 6-7, the end cover 32 could be removed without disassembling the remainder of control assembly 30. Thus, control assembly 30 is adaptable to implementations having a mechanical back-up and those without such mechanical back-ups. And in at least one implementation, a supplier of steer-by-wire assemblies may deliver the steer-by-wire assembly 12 shown in FIG. 1 to a vehicle manufacturer, and the manufacturer may determine whether to implement the steer-by-wire assembly with or without the cover 32.

Still other embodiments exist as well. For example, in one embodiment, the distal end 48 of the shaft 44 may protrude from the retainer 110. The shaft 44 may carry an annular bearing on an outer surface thereof near the distal end 48—e.g., being retained thereon via radially outwardly extending features of the shaft 44, a spring clip, a combination thereof, or the like. When assembled, the bearing may be sandwiched between the shaft 44 and an inner surface of the cover 32. For example, the cavity 170 within cover 32 may have a different shape to accommodate the annular bearing; thus, the bearing may further facilitate rotation of the shaft 44 within the control assembly 30 during operation.

In another embodiment, the buttress plate 92 may have a one-piece construction instead of a three-piece construction, as described above. For example, plate 92 may be an annular disk having circumferentially extending slots spaced between a center opening and an outer periphery. And during operation, the slots may permit stronger magnetic attraction of the armature 78 (e.g., a stronger magnetic flux path). More specifically, operational efficiency may be improved as the armature attraction requires less voltage and less power.

Thus, there has been described a vehicle steer-by-wire system that includes a steer-by-wire assembly having a shaft and a steering control assembly. When the system is operating normally and electrical power is available, components of the control assembly are not engaged and the vehicle may be steered-by-wire. When a steering input reaches a desired rotational end stop, the components of the control assembly may engage thereby inhibiting additional shaft rotation (e.g., in the clockwise and/or counter-clockwise directions). Also, if a fault occurs or electrical power becomes unavailable, then components of the control assembly also may engage inhibiting rotation (e.g., may lock). In at least one embodiment, a mechanical backup linkage may be coupled to the steer-by-wire system—and should electrical power become unavailable, the components of the control assembly engage to permit mechanical backup steering.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A steer-by-wire assembly for a steering system in a vehicle, comprising:
   a shaft coupled to a steering input and rotatable in response to rotation of the steering input;
   a clutch, comprising:
      a brake member rotatable with the shaft; and
      a reaction member; and
   an electromagnetic actuator that is selectively actuated to provide a force to selectively engage the brake and reaction members,
   wherein, when the actuator is not actuated, the force between the brake and reaction members limits or prevents rotation of the brake member relative to the reaction member, and when the actuator is actuated, the force between the brake and reaction members is reduced or removed to permit rotation of the brake member relative to the reaction member.

2. The system of claim 1, further comprising a retainer that carries the reaction member, wherein, when the actuator is not actuated, the force between the brake and reaction members limit or prevent rotation of the shaft relative to the retainer.

3. The system of claim 2, wherein rotation of the retainer is limited or prevented.

4. The system of claim 2, wherein the rotation of the retainer is not limited or prevented.

5. The system of claim 1, further comprising an armature rotatable with the shaft, wherein, when the actuator is not actuated, the armature urges the brake member and the reaction member together to limit or prevent rotation of the brake member relative to the reaction member.

6. The system of claim 5, wherein the actuator further comprises a buttress plate positioned between the actuator and the armature and a biasing member that yieldably biases the armature away from the buttress plate.

7. The system of claim 1, further comprising a biasing member, wherein, when the actuator is not actuated, the biasing member urges the brake member and the reaction member together to limit or prevent rotation of the brake member relative to the reaction member.

8. The system of claim 1, further comprising a plurality of brake members rotatable with the shaft and a plurality of reaction members each of which are located interstitially between the plurality of brake members, wherein, when the actuator is not actuated, the force between two adjacently located brake members of the plurality of brake members and an interstitially located one of the plurality of reaction members limits or prevents rotation of the two brake members relative to the interstitially-located reaction member, and wherein, when the actuator is actuated, the force between the two adjacently located brake members and the interstitially-located reaction member is reduced or removed to permit rotation of the two brake members relative to the interstitially-located reaction member.

9. The system of claim 1, wherein the actuator, the brake member, and the reaction member have an annular shape, wherein the shaft extends through the annularly-shaped actuator, the annularly-shaped brake member, and the annularly-shaped reaction member.

10. The system of claim 1 wherein the actuator is disposed around the shaft.

11. The system of claim 10 wherein the actuator is located between two opposed ends of the shaft.

12. The system of claim 10 wherein the actuator includes an annular coil and the coil surrounds part of the shaft.

13. The system of claim 1 further comprising a steering mechanism operated by the steer-by-wire assembly, the steering mechanism being coupled to multiple wheels of a vehicle to drive the wheels rightward or leftward to change a direction of vehicle travel.

14. The system of claim 1 further comprising a steering mechanism operated by the steer-by-wire assembly, the steering mechanism adapted to be coupled to multiple wheels of a vehicle to drive the wheels rightward or leftward to change a direction of vehicle travel.

15. The system of claim 14 wherein the steering mechanism is electrically coupled to the steer-by-wire assembly.

16. The system of claim 14 wherein the steering mechanism is mechanically coupled to the steer-by-wire assembly.

17. A steer-by-wire assembly for a steering system in a vehicle, comprising:
   a shaft rotatable in response to a steering input;
   a clutch having a brake member rotatable with the shaft, and a reaction member;
   an electromagnetic actuator that is selectively actuated to provide a force to selectively engage the brake and reaction members;
   a retainer that carries the reaction member; and
   a steering mechanism coupled to the retainer, wherein when the actuator is not actuated, the force between the brake and reaction members limits or prevents rotation of the brake member relative to the reaction member, and when the actuator is actuated, the force between the brake and reaction members is reduced or removed to permit rotation of the brake member relative to the reaction member, and wherein, when the actuator is not actuated, the force between the brake and reaction members limit or prevent rotation of the shaft relative to the retainer, wherein the rotation of the retainer is not limited or prevented and when the actuator is not actuated, the shaft, the retainer, and the steering mechanism rotate together.

18. The system of claim 17, further comprising an armature rotatable with the shaft, wherein, when the actuator is not actuated, the armature urges the brake member and the reaction member together to limit or prevent rotation of the brake member relative to the reaction member.

19. The system of claim 17, further comprising a biasing member, wherein, when the actuator is not actuated, the biasing member urges the brake member and the reaction member together to limit or prevent rotation of the brake member relative to the reaction member.

20. The system of claim 17, further comprising a retainer that carries the reaction member, wherein, when the actuator is not actuated, the force between the brake and reaction members limit or prevent rotation of the shaft relative to the retainer.

21. The system of claim 17 wherein the actuator, the brake member, and the reaction member have an annular shape, wherein the shaft extends through the annularly-shaped actuator, the annularly-shaped brake member, and the annularly-shaped reaction member.

22. A steer-by-wire assembly for a steering system in a vehicle, comprising:
   a shaft rotatable in response to a steering input;
   a clutch having a brake member rotatable with the shaft, and a reaction member;
   an electromagnetic actuator that is selectively actuated to provide a force to selectively engage the brake and reaction members; and a feedback motor coupled to the shaft, wherein, based on the steering input, the motor is adapted to provide a rotational resistance profile and wherein, when the actuator is not actuated, the force between the brake and reaction members limits or prevents rotation of the brake member relative to the reaction member, and when the actuator is actuated, the force between the brake and reaction members is reduced or removed to permit rotation of the brake member relative to the reaction member.

23. The system of claim 22, further comprising a retainer that carries the reaction member, wherein, when the actuator is not actuated, the force between the brake and reaction members limit or prevent rotation of the shaft relative to the retainer.

24. The system of claim 23, wherein rotation of the retainer is limited or prevented.

25. The system of claim 22, further comprising an armature rotatable with the shaft, wherein, when the actuator is not actuated, the armature urges the brake member and the reaction member together to limit or prevent rotation of the brake member relative to the reaction member.

26. A steer-by-wire assembly for a steering system in a vehicle, comprising:
a shaft rotatable in response to a steering input;
a clutch having a plurality of brake members rotatable with the shaft, a plurality of reaction members each of which are located interstitially between the plurality of brake members, and a plurality of biasing members located interstitially between the plurality of brake members such that one of the plurality of biasing members is located between the two adjacently located brake members; and
an electromagnetic actuator that is selectively actuated to provide a force to selectively engage the brake and reaction members, wherein, when the actuator is actuated, the one biasing member urges the two adjacently located brake members away from one another, and wherein, when the actuator is not actuated, the force between two adjacently located brake members of the plurality of brake members and an interstitially located one of the plurality of reaction members limits or prevents rotation of the two brake members relative to the interstitially-located reaction member, and wherein, when the actuator is actuated, the force between the two adjacently located brake members and the interstitially-located reaction member is reduced or removed to permit rotation of the two brake members relative to the interstitially-located reaction member.

27. The system of claim 26, further comprising a retainer that carries the reaction member, wherein, when the actuator is not actuated, the force between the brake and reaction members limit or prevent rotation of the shaft relative to the retainer.

28. The system of claim 26, further comprising an armature rotatable with the shaft, wherein, when the actuator is not actuated, the armature urges the brake member and the reaction member together to limit or prevent rotation of the brake member relative to the reaction member.

29. The system of claim 26 wherein the actuator, the brake member, and the reaction member have an annular shape, wherein the shaft extends through the annularly-shaped actuator, the annularly-shaped brake member, and the annularly-shaped reaction member.

30. A steer-by-wire assembly for a steering system in a vehicle, comprising:

a shaft coupled to a steering input and rotatable in response to rotation of the steering input;
a clutch, comprising:
a brake member rotatable with the shaft;
a retainer; and
a reaction member carried by the retainer;
an electromagnetic actuator that is selectively actuated to selectively provide a force to selectively engage the brake and reaction members; and
wherein, when the actuator is not actuated, the force between the brake and reaction members limit or prevent rotation of the brake member relative to the reaction member and also limits or prevents rotation of the shaft relative to the retainer, and when the actuator is actuated, the force between the brake and reaction members is reduced or removed to permit rotation of the shaft and brake member relative to the reaction member.

31. The system of claim 30, wherein the retainer is coupled to the vehicle or another steer-by-wire assembly component to limit or prevent rotation of the retainer.

32. The system of claim 30, wherein the rotation of the retainer is not limited or prevented.

33. A steer-by-wire assembly for a steering system in a vehicle, comprising:
a shaft rotatable in response to a steering input;
a clutch, comprising:
a brake member rotatable with the shaft;
a retainer; and
a reaction member carried by the retainer;
an electromagnetic actuator that is selectively actuated to selectively provide a force to selectively engage the brake and reaction members; and
wherein, when the actuator is not actuated, the force between the brake and reaction members limit or prevent rotation of the brake member relative to the reaction member and also limits or prevents rotation of the shaft relative to the retainer, and when the actuator is actuated, the force between the brake and reaction members is reduced or removed to permit rotation of the shaft and brake member relative to the reaction member wherein the retainer is coupled to the vehicle or another steer-by-wire assembly component to limit or prevent rotation of the retainer and wherein the retainer is coupled to an end cover for the clutch, wherein the coupling to the end cover limits or prevents rotation of the retainer.

34. The system of claim 33 further comprising an armature rotatable with the shaft, wherein, when the actuator is not actuated, the armature urges the brake member and the reaction member together to limit or prevent rotation of the brake member relative to the reaction member.

35. The system of claim 33 wherein the actuator is disposed around the shaft.

36. The system of claim 33 wherein the actuator is located between two opposed ends of the shaft.

37. The system of claim 35 wherein the actuator includes an annular coil and the coil surrounds part of the shaft.

38. A steer-by-wire assembly for a steering system in a vehicle, comprising:
a shaft rotatable in response to a steering input;
a clutch, comprising:
a brake member rotatable with the shaft;
a retainer; and
a reaction member carried by the retainer;
an electromagnetic actuator that is selectively actuated to selectively provide a force to selectively engage the brake and reaction members, and wherein, when the actuator is not actuated, the force between the brake and reaction members limit or prevent rotation of the brake member relative to the reaction member and also limits or prevents rotation of the shaft relative to the retainer, and when the actuator is actuated, the force between the brake and reaction members is reduced or removed to permit rotation of the shaft and brake member relative to the reaction member, and wherein the retainer is coupled to the vehicle or another steer-by-wire assembly component to limit or prevent rotation of the retainer and further comprising a mechanical steering mechanism coupled to the retainer, wherein, when the actuator is not actuated, the retainer rotates with the steering mechanism.

39. The system of claim 38 further comprising an armature rotatable with the shaft, wherein, when the actuator is not actuated, the armature urges the brake member and the reaction member together to limit or prevent rotation of the brake member relative to the reaction member.

40. The system of claim 38 wherein the actuator is disposed around the shaft.

41. The system of claim 38 wherein the actuator is located between two opposed ends of the shaft.

42. A steer-by-wire assembly for a steering system in a vehicle, comprising:
   a shaft rotatable in response to a steering input;
   a clutch, comprising:
      a brake member rotatable with the shaft;
      a retainer; and
      a reaction member carried by the retainer;
   an electromagnetic actuator that is selectively actuated to selectively provide a force to selectively engage the brake and reaction members, and wherein, when the actuator is not actuated, the force between the brake and reaction members limit or prevent rotation of the brake member relative to the reaction member and also limits or prevents rotation of the shaft relative to the retainer, and when the actuator is actuated, the force between the brake and reaction members is reduced or removed to permit rotation of the shaft and brake member relative to the reaction member wherein the actuator, the brake member, the reaction member, and a base of the retainer have an annular shape, wherein the shaft extends through the annularly-shaped actuator, the annularly-shaped brake member, the annularly-shaped reaction member, and the annularly-shaped base.

43. The system of claim 42 further comprising an armature rotatable with the shaft, wherein, when the actuator is not actuated, the armature urges the brake member and the reaction member together to limit or prevent rotation of the brake member relative to the reaction member.

44. The system of claim 42 further comprising a biasing member, wherein, when the actuator is not actuated, the biasing member urges the brake member and the reaction member together to limit or prevent rotation of the brake member relative to the reaction member.

45. The system of claim 1 wherein the steering input includes a steering wheel coupled to the shaft and wherein the shaft rotates as the steering wheel rotates, and wherein the clutch selectively inhibits or prevents rotation of the shaft and steering wheel.

\* \* \* \* \*